(12) United States Patent
Hallgren et al.

(10) Patent No.: US 10,052,579 B2
(45) Date of Patent: Aug. 21, 2018

(54) DUST COLLECTOR WITH A CONSTANT SUCTION FORCE

(71) Applicant: HUSQVARNA AB, Huskvarna (SE)

(72) Inventors: Ingvar Hallgren, Stockholm (SE); Daniel Johansson, Stockholm (SE)

(73) Assignee: HUSQVARNA AB, Huskvarna (SE)

( * ) Notice: Subject to any disclaimer, the term of this patent is extended or adjusted under 35 U.S.C. 154(b) by 662 days.

(21) Appl. No.: 13/732,248

(22) Filed: Dec. 31, 2012

(65) Prior Publication Data

US 2013/0199137 A1 Aug. 8, 2013

Related U.S. Application Data

(63) Continuation-in-part of application No. PCT/SE2012/051062, filed on Oct. 5, 2012.

(30) Foreign Application Priority Data

Oct. 6, 2011 (SE) ...................................... 1100739

(51) Int. Cl.
*B01D 45/12* (2006.01)
*B01D 45/16* (2006.01)
(Continued)

(52) U.S. Cl.
CPC ............ *B01D 45/12* (2013.01); *B01D 45/16* (2013.01); *B01D 45/18* (2013.01);
(Continued)

(58) Field of Classification Search
CPC ...... B01D 45/12; B01D 45/16; B01D 50/002; B01D 45/18; B01D 46/2411; B01D 46/48;
(Continued)

(56) References Cited

U.S. PATENT DOCUMENTS 1,573,135 A * 2/1926 Bourne et al. ............ B04C 7/00
55/398
2,392,872 A * 1/1946 Wolfe ...................... B04C 5/26
55/345
(Continued)

FOREIGN PATENT DOCUMENTS

CN 2645749 Y 10/2004
CN 2680336 Y 2/2005
(Continued)

OTHER PUBLICATIONS

Extended Search Report and Written Opinion of corresponding European application No. 12838203.3 dated Sep. 30, 2015.
(Continued)

*Primary Examiner* — Amber R Orlando
*Assistant Examiner* — Stephen Hobson
(74) *Attorney, Agent, or Firm* — McNair Law Firm, P.A.

(57) ABSTRACT

A dust collector including a cylindrical cyclone tube, a central outlet channel, a swirl generator, and a swirl reflector is disclosed. The cylindrical cyclone tube can include one or more inlets. The central outlet channel includes a lower inlet end and an upper outlet end, wherein the upper outlet end is located above the one or more inlets. The swirl generator can be configured to generate a swirl between the cylindrical cyclone tube and the central outlet channel, the swirl generator configured to encircle the central outlet channel. The swirl reflector can be located near a bottom of the cylindrical cyclone tube and forming a particle chamber there below. A distance between the swirl reflector and the lower inlet end of the central outlet channel can be between ten to fifty percent of the length of the cylindrical cyclone tube from the one or more inlets to the swirl reflector.

20 Claims, 8 Drawing Sheets

(51) Int. Cl.
  *B04C 5/081* (2006.01)
  *B04C 7/00* (2006.01)
  *B01D 45/18* (2006.01)
  *B01D 46/24* (2006.01)
  *B01D 46/48* (2006.01)
  *B01D 50/00* (2006.01)
  *B04C 5/103* (2006.01)
  *B04C 5/185* (2006.01)
  *B04C 5/22* (2006.01)
  *B04C 9/00* (2006.01)

(52) U.S. Cl.
  CPC .......... *B01D 46/2411* (2013.01); *B01D 46/48* (2013.01); *B01D 50/002* (2013.01); *B04C 5/081* (2013.01); *B04C 5/103* (2013.01); *B04C 5/185* (2013.01); *B04C 5/22* (2013.01); *B04C 7/00* (2013.01); *B04C 9/00* (2013.01); *B04C 2009/004* (2013.01)

(58) Field of Classification Search
  CPC .......... B04C 9/00; B04C 5/103; B04C 5/185; B04C 5/22; B04C 7/00; B04C 5/08; B04C 2009/004
  USPC .................................................. 95/34, 271
  See application file for complete search history.

(56) References Cited

U.S. PATENT DOCUMENTS

| | | | | |
|---|---|---|---|---|
| 2,402,845 A * | 6/1946 | Rodman | B04C 7/00 | 55/345 |
| 2,433,774 A * | 12/1947 | Madely | B04C 5/28 | 55/342 |
| 2,511,713 A * | 6/1950 | Hoyle | F01N 1/08 | 181/261 |
| 2,569,710 A * | 10/1951 | Fitzpatrick | F23J 15/027 | 110/165 R |
| 2,647,588 A * | 8/1953 | Miller | F23J 15/027 | 110/165 A |
| 2,664,966 A * | 1/1954 | Moore | B04C 3/00 | 55/338 |
| 2,768,707 A * | 10/1956 | Langdon Campbell | B04C 5/00 | 55/320 |
| 2,889,008 A * | 6/1959 | Copp | B04C 5/28 | 55/348 |
| 2,936,043 A * | 5/1960 | Armstrong | B04C 5/06 | 55/416 |
| 3,169,842 A * | 2/1965 | Streete | B04C 5/14 | 55/449 |
| 3,283,480 A * | 11/1966 | Szego | B04C 5/12 | 209/719 |
| 3,698,555 A | 10/1972 | Conner | | |
| 3,802,570 A * | 4/1974 | Dehne | B04C 5/14 | 209/720 |
| 4,144,043 A * | 3/1979 | Johnston | B01D 50/00 | 175/206 |
| 4,162,906 A * | 7/1979 | Sullivan | B04C 3/00 | 210/512.1 |
| 4,204,849 A * | 5/1980 | Johnston | B01D 46/0068 | 175/206 |
| 4,735,639 A * | 4/1988 | Johnstone | A47L 5/365 | 55/302 |
| 4,756,729 A * | 7/1988 | Brunnnnair | B01D 45/12 | 55/391 |
| 4,820,315 A * | 4/1989 | DeMarco | B01D 46/00 | 55/337 |
| 4,865,751 A * | 9/1989 | Smisson | B01D 21/10 | 210/788 |
| 4,963,172 A * | 10/1990 | DeMarco | B01D 46/00 | 141/59 |
| 5,061,305 A * | 10/1991 | Karmel | A47L 5/38 | 55/429 |
| 5,078,761 A * | 1/1992 | Dyson | A47L 9/1633 | 55/337 |
| 5,089,037 A * | 2/1992 | Marsolais | A47L 5/36 | 15/323 |
| 5,391,294 A * | 2/1995 | Mercier | B04C 5/081 | 210/151 |
| 5,428,589 A * | 6/1995 | Shtipelman | G11B 7/0932 | 359/813 |
| 6,395,046 B1* | 5/2002 | Emig | B01D 39/1623 | 15/347 |
| 6,428,589 B1* | 8/2002 | Bair | A47L 9/1608 | 15/353 |
| 6,482,252 B1* | 11/2002 | Conrad | A47L 9/122 | 15/352 |
| 6,596,170 B2* | 7/2003 | Tuszko | B04C 5/081 | 209/715 |
| 6,889,403 B2* | 5/2005 | Inoue | A47L 9/165 | 15/347 |
| 7,105,034 B2 | 9/2006 | Jung et al. | | |
| RE40,048 E * | 2/2008 | Witter | B01D 50/002 | 451/88 |
| 7,722,693 B2* | 5/2010 | Yoo | A47L 9/1633 | 15/352 |
| 7,766,989 B2* | 8/2010 | Lane | B01D 45/06 | 55/424 |
| 7,833,304 B2* | 11/2010 | Pearson | B01D 46/0031 | 55/414 |
| 7,988,756 B2 | 8/2011 | Fujiyama et al. | | |
| 2002/0020154 A1* | 2/2002 | Yang | A47L 9/165 | 55/337 |
| 2004/0040270 A1* | 3/2004 | Inoue | A47L 5/28 | 55/345 |
| 2004/0112022 A1 | 6/2004 | Vuijk | | |
| 2006/0162298 A1 | 7/2006 | Oh et al. | | |
| 2007/0095746 A1* | 5/2007 | Minichello | B01D 29/15 | 210/450 |
| 2007/0175185 A1 | 8/2007 | Kim et al. | | |
| 2008/0290023 A1* | 11/2008 | Greene | B01D 21/2444 | 210/512.1 |
| 2009/0113859 A1* | 5/2009 | Oh | A47L 9/1625 | 55/337 |
| 2011/0294643 A1* | 12/2011 | Ford | B04C 5/04 | 494/56 |
| 2012/0151710 A1* | 6/2012 | Yarbrough | A47L 9/20 | 15/347 |
| 2015/0238979 A1* | 8/2015 | Cabezas Morales | B04C 5/06 | 55/346 |

FOREIGN PATENT DOCUMENTS

| | | | | |
|---|---|---|---|---|
| CN | 1799677 A | 7/2006 | | |
| CN | 101006910 A | 8/2007 | | |
| CN | 101489643 A | 7/2009 | | |
| DE | 19752090 A1 | 5/1999 | | |
| EP | 0885585 A1 | 12/1998 | | |
| GB | 555558 A * | 8/1943 | | B04C 5/24 |
| GB | 2326360 A * | 12/1998 | | A47L 9/1633 |
| GB | 2326360 A | 12/1998 | | |
| JP | 2004321777 A | 11/2004 | | |
| KR | 1020110037569 A | 4/2011 | | |
| WO | 02067752 A1 | 9/2002 | | |
| WO | 02069778 A1 | 9/2002 | | |
| WO | 2006026414 A1 | 3/2006 | | |

OTHER PUBLICATIONS

International Search Report and Written Opinion for International patent application No. PCT/SE2012/051062 dated Mar. 14, 2013.
International Preliminary Report on Patentability in the International Application No. from PCT/SE2012/051062 dated Jan. 31, 2014.

* cited by examiner

DUST COLLECTOR WITH A CONSTANT SUCTION FORCE

CROSS-REFERENCE TO RELATED APPLICATION

This application is a continuation-in-part application of International Application No. PCT/SE2012/051062, filed on Oct. 5, 2012, which claims priority to SE 1100739-0, filed Oct. 6, 2011.

FIELD

This disclosure relates to a dust collector with a constant suction force and an integrated pre-separator.

BACKGROUND

The majority of dust collectors are based on filter technology with a filter medium consisting of socks, or folded cartridge filters, usually integrated in a container with an inlet similar to a cyclone inlet.

The disadvantage of the filter technology is that in the presence of a moderate amount of dust, the pressure drop of the dust collector increases and the suction force decreases. This disadvantage creates a need for additional maintenance of the dust collector. For example, concrete grinding requires that all of the abrasive residue be removed before the next grinding cycle. Existing methods for filter cleaning requires releasing the vacuum several times in succession, by opening a relief valve. This cleaning procedure leads to long working shifts and low productivity.

Traditional cyclones with a characteristic conical bottom have not been able to replace hose and cartridge filters because of a poor separation capability, especially for dust particles below 5 microns.

BRIEF DESCRIPTION OF THE DRAWINGS

Reference will now be made, by way of example, to the accompanying drawings which show example embodiments of the present application, and in which.

DETAILED DESCRIPTION

Figure 1:
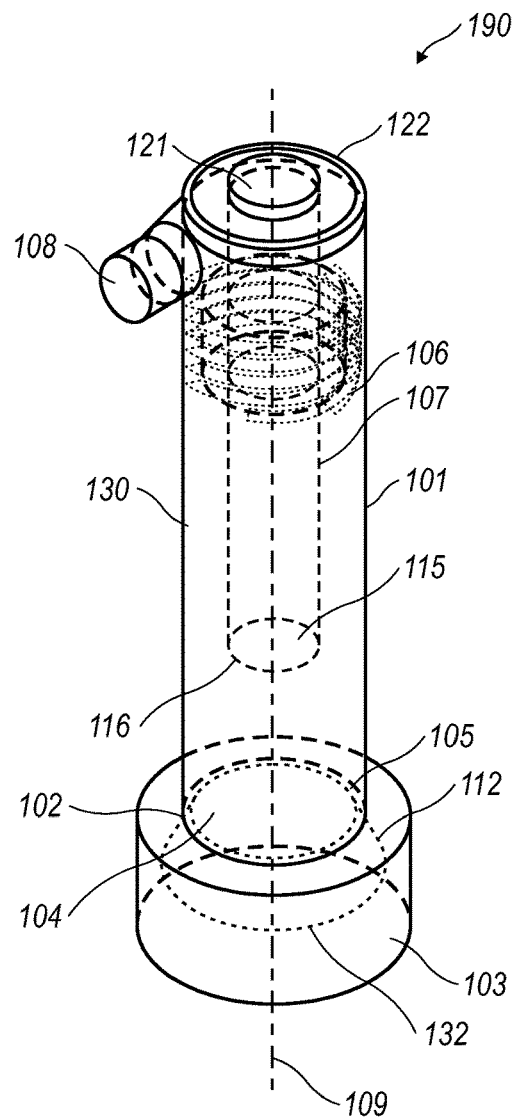
FIG. 1 is an exemplarily illustration of a dust collector configured according to the present technology, wherein the inlet is a tangential flow inlet.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Reference now will be made in detail to implementations of the technology. Each example is provided by way of explanation of the technology only, not as a limitation of the technology. It will be apparent to those skilled in the art that various modifications and variations can be made in the present technology without departing from the scope of the technology. For instance, features described as part of one implementation can be used on another implementation to yield a still further implementation. Thus, it is intended that the present technology cover such modifications and variations that come within the scope of the technology.

The present technology in the form of a dust collector can include one or more cyclone tubes that each has one or more inlets. The present technology can also include a central outlet channel. The central outlet channel can include a lower inlet end and an upper outlet end. In at least one implementation, the present technology can include a swirl generator. The present technology can also include a swirl reflector that is located near the bottom of the cyclone tube to reflect the flow of fluid while allowing particles to pass into a particle chamber located below the swirl reflector.

While the present technology has been described above as a dust collector, the technology can be implemented to remove particles from a fluid, which can be either a liquid or a gas. In at least one embodiment, the fluid is air.

The present technology will be further described below in relation to illustrated embodiments. The illustrated embodiments have been simplified to provide a clear illustration of the present technology. The present technology can be configured to filter a variety of differently sized particles from a fluid. In at least one implementation, the present technology can be configured to filter particles having a smallest size between 1-5 microns. In other embodiments the filter can be implemented to filter particles sized 3 microns and larger. Other filtration sizes can also be arranged according to the present technology.

While not illustrated, the present technology can be coupled to another device which provides for a suction force from the inlet to the outlet of the dust collector. For example, a gas sink or well can be coupled to the outlet of the dust collector to cause the flow of gas from the inlet to the outlet of the dust collector. In another implementation, a fan can be provided upstream of the inlet and generate the desired fluid flow in the dust collector from the inlet to the outlet. In yet another implementation, a suction device can be provided downstream of the outlet of the dust collector. When the dust collector is implemented with a liquid, a pump can be located upstream of the inlet or downstream of the outlet to cause the liquid to flow through the dust collector.

Figure 2:
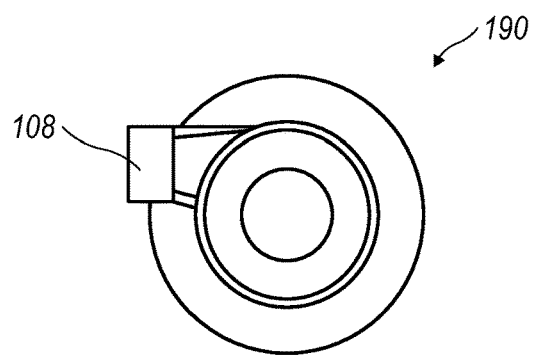
FIG. 2 is an exemplarily top plan view of the dust collector of FIG. 1.
Figures 3, 4:
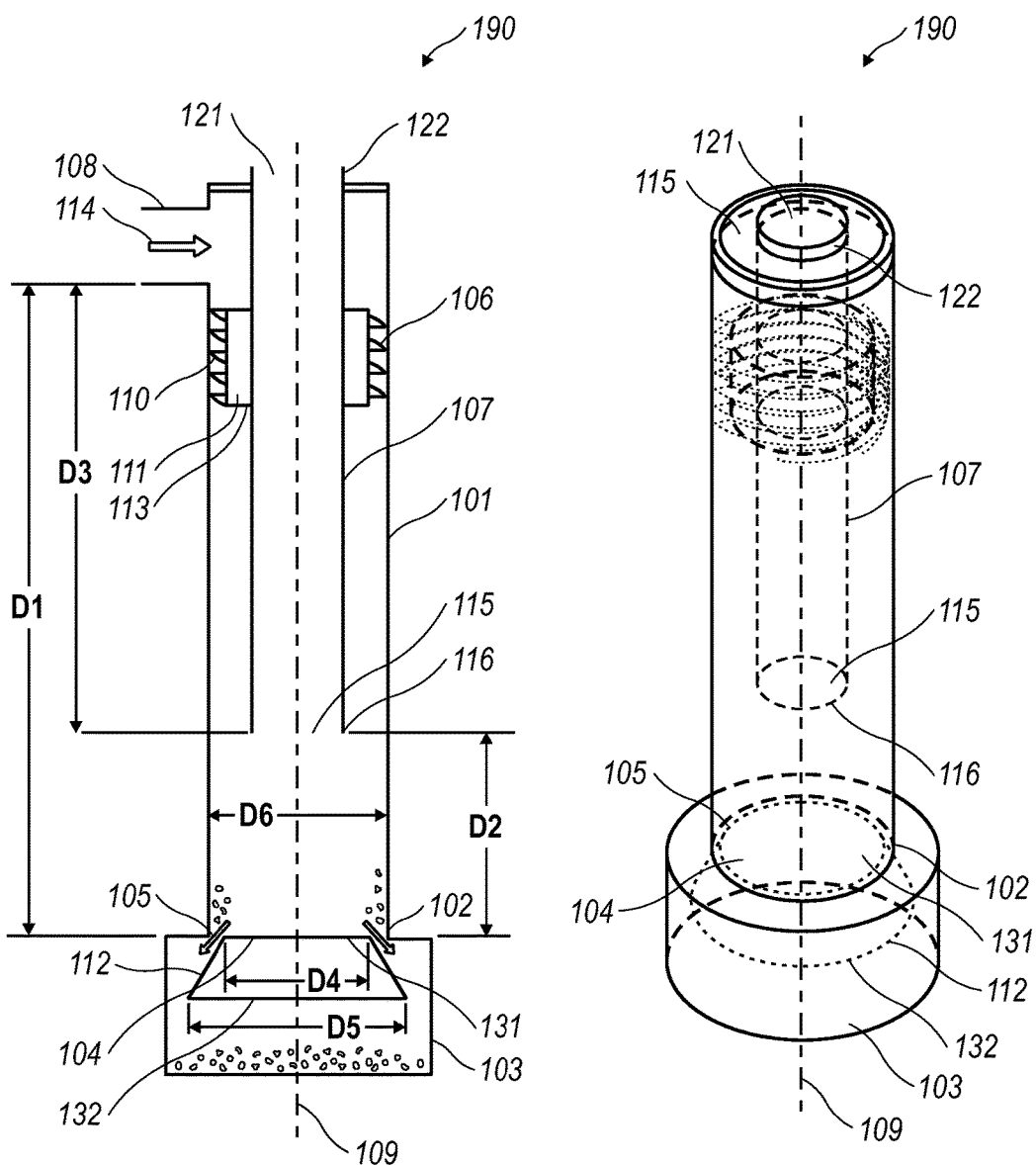
FIG. 3 is cross-sectional view of the dust collector of FIG. 1.
FIG. 4 is an alternative illustration of the dust collector configured according to the present technology, wherein the inlet is an axial flow inlet.

FIGS. 1-3 illustrate an implementation according to the present technology. As illustrated in FIG. 1, the dust collector 190 can include a cyclone tube 101 having one or more inlets 108 and a central outlet channel 107. In one example, the cyclone tube 101 can be cylindrical. The cylinder can take a variety of different forms. For example, the cylinder can be a right circular cylinder such that the two ends of the tube (a structure with two ends) are substantially the same size and the side walls are substantially straight and parallel. In other embodiments, the cylinder can have one end that is a different size from the other end, such that the side walls taper from one end to the other end. In yet another embodiment, the ends can be formed in a variety of different shapes such that the cylinder is in the form of a prism, (not shown).

The central outlet channel 107 can include a lower inlet end 116 and an upper outlet end 122. The upper outlet end 122 can be located above the one or more inlets 108. While a single inlet 108 is illustrated, two or more inlets 108 can be included on the dust collector 190. When two or more inlets are included, the spacing of the inlets can be such that there is equal spacing between the inlets. In other embodiments, the inlets can be closer together in one direction along the perimeter of the cyclone tube as compared to the other direction.

Turning to FIG. 3 as the fluid passes from the inlet 108 to the outlet 121, the fluid passes through a swirl generator 106, which can be situated around a central outlet channel or pipe 107. The flow of the fluid can be controlled primarily by the inlet 108 and the outlet 121. As illustrated by arrow 114, the flow direction is from outside of the dust collector 190 into the inlet 108. The swirl generator 106 can be configured to generate a swirl between the cylindrical cyclone tube 101 and the central outlet channel 107. The swirl generator 106 can be configured to encircle the central outlet channel 107. Thus, the swirl generator 106 can assist in controlling and/or inducing a cyclone movement between the cylindrical cyclone tube 101 and the central outlet channel 107, specifically in space 130 formed between the cylindrical cyclone tube 101 and the central outlet channel 107. A top end of the swirl generator 106 can be below the inlet 108. In at least one embodiment, the swirl generator 106 can be coupled to the central outlet channel 107.

The swirl generator 106 can cause the fluid and particles to rotate in helical orbits towards a swirl reflector 104 below the inlet end 108 of the tube 101. The swirl generator 106 can include a plurality of helical channels composed of one or more guide vanes 110. The number of guide vanes 110 can be selected based on desired flow characteristics. For example the number of guide vanes 110 can be between one and eight. In at least one embodiment, the number of guide vanes 110 is six. When the guide vanes 110 are two or fewer, the resulting flow can be harder to control and become turbulent. The number of guide vanes 110 implemented can vary with the size of the swirl generator 106, including the length and diameter of the swirl generator 106. The plurality of guide vanes 110 can be formed on an exterior of a cylindrical member 111. Furthermore, the swirl generator 106 can have a bottom side 113 that is located closest to the inlet 115 of the central outlet channel 107.

The length of the swirl generator 106 used can depend on the operating needs of a user. A longer swirl generator 106 can require a greater amount of power to create a given amount of flow. The length, flow area, inlet vane angle and outlet vane angel of the swirl generator 106 can be configured to provide a desired combination of separation sharpness and pressure drop. The swirl generator 106 as indicated above can be configured for a variety of flow configurations depending on the desired application.

The swirl generator 106 adds an additional flow regulator as compared to previous cyclone filtration devices which do not include a swirl generator 106. As explained below, the swirl generator 106 enables control of the flow speed as well as other characteristics of the flow. The swirl generator 106 also provides continuing laminar flow in circumstances in which a filtration device without the swirl generator 106 would not. In at least one embodiment, the swirl generator 106 can be configured to provide for flow speeds between twenty meters per second and eighty meters per second. The flow rate and the flow direction can be influenced by the number of guide vanes 110 and their height and angle with respect to the center axis. Flow rate and flow direction can affect the residence time of the particles before they reach the entrance to a particle chamber situated behind a central swirl reflector 104 surrounded by openings.

If the dust collector 190 is to be used at varying flow rates, for example a lower flow rate, the flow area of the swirl generator 106 can be reduced by means of an inflatable central wall (not shown) affixed to the central outlet channel 107. When the inflatable central wall is affixed to the central outlet channel 107, the inflatable central wall decreases the distance between the inner wall of the cyclone tube 101 and the central outlet channel 107. As the distance between the inner wall of the cyclone tube 101 and the central outlet channel 107 decreases, the flow area is reduced. When the flow area is reduced, it causes the flow speed to rise allowing for increased efficiency and also high drag and pressure drop. The separation efficiency is proportional to the tangential velocity of a fluid flowing across the inner wall of the cyclone tube squared divided by the inner radius of the inner wall of the cyclone tube 101, or the radius of the particles current position in a radial direction. However, the pressure drop also increases with this ratio, and thus the final parameter selection will necessarily be a compromise between pressure drop and separation efficiency. An overall goal of the disclosure is that the flow through the dust collector 190 be substantially free of turbulence. A swirl generator 106 according to the present disclosure can be designed to ensure a substantially laminar flow through the dust collector 190.

The swirl generator can be configured to ensure that collected particles will have an appropriate flow angle and an appropriate residence time in the cyclone, so as to allow particulate matter to fall against the wall boundary layer before the particles reach the lower end 116 of the central outlet channel 107, whereby the risk that the particles will be drawn into the central outlet channel 107 is minimized. For example, when the dust collector 190 includes the swirl generator 106, the helical paths of the particles can be configured so that the particles reach the inner wall of the cyclone tube 101 before they encounter the swirl reflector 104. For example, in at least one embodiment, an angle of between 65 degrees and 80 degrees, relative to the central axis of revolution 109. In at least one embodiment, the angle can be between 70 and 75 degrees. If the angle is measured in a different direction, the angle can be said to be between 10 degrees and 25 degrees. And in at least one embodiment the angle can be between 15 and 20 degrees.

When the fluid vortex reaches the swirl reflector 104, it turns rapidly towards the central outlet channel 107 and further out through an outlet 121 in the central outlet channel 107 that is on the upper outlet end 122 of the central outlet channel 107. The relatively large distance between the separated particles in the boundary layer along the inside of the cyclone tube 101, and the location of the fast turnaround area of the air vortex in the center of the cyclone, can contribute to effective collection of particles and/or dust. The cyclone tube 101 can be in the form of a circular tube. A gap 105 can formed between the swirl reflector 104 and the inner wall of the cyclone tube 101. The gap 105 can be sized based upon the diameter of the inner wall of the cyclone tube 101. In at least one embodiment, the gap 105 is between five and ten percent of the inner diameter of the inner wall of the cyclone tube 101. For example, in at least one embodiment, when the diameter of the inner wall of the cyclone tube 101 is 0.5 meter, the gap 105 can be 0.025 meter. In another embodiment, when the diameter of the inner wall of the cyclone tube 101 is 0.1 meter, the gap 105 can be 0.008 meter.

In at least one embodiment, the size of gap 105 is constant. In another embodiment, the gap can be configured to be adjusted between a first predetermined size and one or more additional predetermined sizes. The adjustment of the gap 105 can be a manual adjustment such that an operator can move the swirl reflector 104. In another embodiment, the gap 105 can be adjusted by having the swirl reflector 104 in a fixed position and adjusting the location of the tapered portion 112.

In another embodiment, the gap 105 can be automatically adjusted. The automatic adjustment can be performed in response to detection of particles in the dust collector 190. In another embodiment, the automatic adjustment can be performed based upon the pressure in the dust collector 190. When the gap 105 is adjustable, it can provide for additional control over the particles that are filtered.

In at least one embodiment it can be desirable to configure the dust collector 190 such that flow through collector 190 is laminar. Laminar flow enables capture of smaller particles in present in the cyclone because the particles can fall gently when they hit the inner wall of the cyclone tube 101.

Additionally when the swirl generator 106 is present, the swirl generator 106 forces the flow to follow a predetermined path, thereby causing the flow to be oriented along the path even when the flow rate is lower than the flow rate otherwise intended for a given dust collector. For example with the presently described swirl generator 106, the cyclone movement can be induced at flow speeds of less than half of the flow speed for which a given inlet 108 and outlet 121 would otherwise be designed to operate. In at least one embodiment, the inlet 108 cross-sectional area is half of the outlet 121 cross sectional area.

A distance D2 between the swirl reflector 104 and the lower inlet end 116 of the central outlet channel 107 can be between ten to fifty percent of the length D1 of the cyclone tube 101 from the one or more inlets 108 to the swirl reflector 104. In at least one embodiment, the distance D2 between the swirl reflector 104 and the lower inlet end 116 of the central outlet channel 107 can be greater than half a length D3 of the central outlet channel 107 from the one or more inlets 108 to the inlet end 116 of the central outlet channel 107.

As illustrated, the swirl generator 106 can be located below the one or more inlets 108. The swirl reflector 104 can include a tapered portion 112. The tapered portion 112 can extend from an upper portion 131 of the swirl reflector 104 to a lower portion 132 of the swirl reflector 104. The lower portion 132 of the swirl reflector 104 can have a greater perimeter than the upper portion 131 of the swirl reflector 104. The perimeter of the lower portion 132 can be greater than an inner perimeter of the cyclone tube 101. When the cyclone tube 101 is a right cylindrical cyclone tube, the lower portion 132 of the swirl reflector 104 can have a greater circumference than the upper portion 131 of the swirl reflector 104 and the circumference of the lower portion 132 can be greater than an inner circumference of the cyclone tube 101. In at least one example, the swirl reflector 104 can have an upper portion 131 that has a diameter D4. The swirl reflector 104 can further include a lower portion 132 that has a diameter D5. The diameter D5 of the lower portion 132 can be greater than the diameter D4 of the upper portion 131. Similarly, diameter D4 of the upper portion can be less than diameter D6 of the inner wall of the cyclone tube 101. Thus, as discussed above, a gap space 105 can be formed between the upper portion 131 of the swirl reflector 104 and the inner wall of the cyclone tube 101. The spacing of the gap space 105 can be as described above. When the perimeter of the lower portion 132 is greater than the perimeter of the upper portion 131, the swirl reflector 104 further prevents particles that enter the particle chamber 103 from exiting. The swirl reflector 104 prevents particles from exiting because of the characteristics of the flow in the particle chamber 103 based upon relative size and placement of the upper portion 131 and lower portion 132 of the swirl reflector 104.

While in at least one embodiment, the swirl reflector 104 can remain in a fixed position, in other embodiments, the swirl reflector 104 can be configured to move in an axial direction along axis 109, making the gap 105 adjustable, as discussed above. In one embodiment, the swirl reflector 104 can be configured to seal the particle chamber 103 from the cylindrical cyclone tube 101 when the dust collector 190 is in an energized state. The energized state refers to the when the dust collector is configured for filtration of dust and/or particles. Axial movement of the swirl reflector 104 along the axis 109 can be in response to the pressure inside of the cyclone tube 101. The swirl reflector 104 can seal the particle chamber 103 from the interior of the cyclone tube 101 until the pressure inside the cylindrical cyclone tube 101 is below a predetermined amount. In at least one embodiment, the predetermined amount is sixty percent of a maximum pressure.

In the energized state the swirl reflector 104 can be configured such that the top portion 131 is above the bottom end 102 of the cyclone tube 101. When the swirl reflector 104 is above the bottom end 102 of the cyclone tube 101, the distance D2 between the swirl reflector 104 and the inlet end 116 of the outlet channel 107 is reduced. When the swirl reflector 104 is configured to move as described, the distance D2 can be selected when the swirl reflector is in the sealed configuration. The swirl reflector 104 can configured to allow particles in the cyclone tube 101 to pass into the particle chamber 103 in a de-energized state. In at least one example, the swirl reflector 104 can include one or more openings configured to permit particles to pass through the swirl reflector, even in the energized state. In at least another example, the swirl reflector 104 can be configured with a solid central portion to provide for a stagnation point as well as to prevent collected particles from being taken up from the particle chamber 103.

The above described components can generate a cyclone movement. As described above, the cyclone movement can be optimized for efficiently capturing the fine dust particles and smaller amounts of dust, thereby increasing the length of working or operating periods because the particle/dust chamber 103 does not need to be emptied as often as would otherwise be the case. The swirl reflector 104 can be located near a bottom 102 of the cylindrical cyclone tube 101, thereby forming a particle chamber 103 below the cyclone tube 101. The particle chamber 103 is shown as being cylindrical in shape with a top side and a bottom side to prevent the escape of the particles. While an access door is not illustrated, an access door can be formed in the bottom side to allow access to, and removal of, collected particulate matter from within the particle chamber 103. In other embodiments, the particle chamber 103 can be formed having no bottom, and instead a bag or hose lock can be coupled to the bottom area of the particle chamber 103. When the bag is implemented, the bag can be removed for easy disposal of the collected particles. Other collection devices can be implemented as well.

Figure 5:
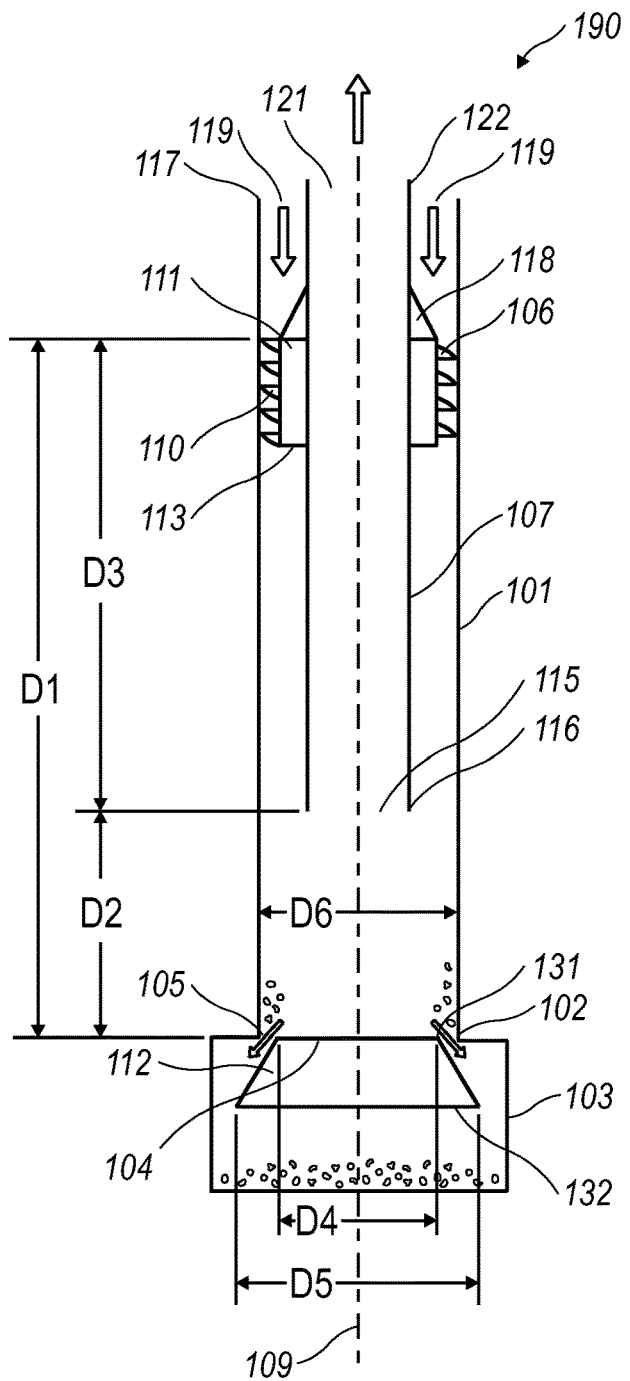
FIG. 5 is a cross-sectional view of the dust collector of FIG. 4.

FIGS. 4-5 illustrate another implementation according to the present technology. The implementation illustrated in FIGS. 4-5 is similar to the implementation illustrated in FIGS. 1-3, except that the inlet 119 of dust collector 190 is arranged in an axial direction rather than a tangential direction relative cyclone tube 101.

When the dust collector 190 is configured with an axial inlet 119 at the top portion 117 of the cyclone tube 101, the swirl generator 106 can be configured as described above with respect to FIGS. 1 and 3. In other embodiments such as the one illustrated in FIG. 5, the swirl generator 106 can comprise an inlet tapered portion 118 that directs flow to vanes 110 of the swirl generator 106. The inlet tapered portion 118 can be a conically shaped portion. The inlet tapered portion 118 can be configured to be separate from the swirl generator 106 or it can be coupled to the swirl generator 106. The inlet tapered portion 118 can be further provided with vanes or channels formed thereon. When the dust collector 190 is provided with an axial inlet 119, the dust collector 190 can be configured with a single connector that couples the inlet 119 and the outlet 121. In at least one embodiment, the single connector can be a quick release coupler. When the dust collector is configured with the single connector, the dust collector 190 can be easily attached and removed to provide for transportation or servicing.

In yet other embodiments, the present technology can include two cyclones and a swirl generator. The first cyclone (inner cyclone) can be integrated into a larger collection cyclone, which relieves the inner cyclone and its flow channels from the largest dust particles as well as larger items which are received into the dust collector.

Figure 6:
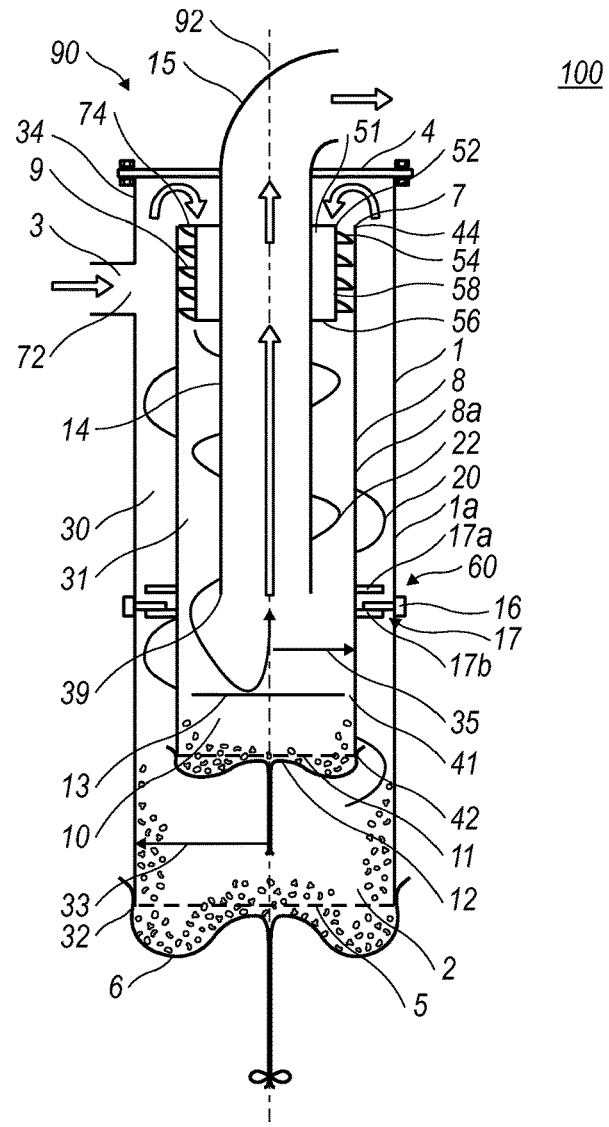
FIG. 6 is an exemplarily diagram of dust collector configured according to the present technology in an operating configuration.

An embodiment of the present technology is shown in FIG. 6, which shows a cross sectional view of a dust collector 90. The dust collectors illustrated in FIGS. 6-9 allow for effective operation in situations where large objects could enter the dust collector and otherwise possibly clog the flow channels in the swirl generator.

The present technology satisfies a desire that the dust collector, from transportation reasons, only consists of one unit is strong, and further users only want to deal with just one major dust-bag or dust-container.

The present technology can implement two cyclones for separation of particles from the incoming fluid, which can be air or another type of gas. The dust collector receives the mixture of the particles and gas and separates the particles from the gas, so that the particles can be disposed of appropriately once separated.

The present disclosure will be explained in reference to FIGS. 6-9. Additionally, an additional filter will be described in relation to FIGS. 6-14. FIGS. 6 and 8 are diagrammatic cross-sectional illustrations of an example dust collector 90 configured according to the present technology. The components as illustrated can be exaggerated to provide for illustration. Additionally, one or more components can be omitted to aid in illustration of the present technology.

An example of dust collector 90 with a substantially constant suction force is illustrated in FIG. 6. As illustrated, the dust collector 90 includes a first cyclone tube 8 and a swirl generator 9. The first cyclone tube 8 can be integrated into a larger collection cyclone tube 1, which relieves the first cyclone tube 8 and its flow channels from the largest dust particles as well as larger items which can be sucked into the dust collector 90.

FIG. 6 illustrates an outer cyclone movement 20 and an inner cyclone movement 22. The outer cyclone movement 20 is generated in the space 30 formed between an outer wall structure 1a and an inner wall structure 8a. The inner cyclone movement 22 is generated inside of the inner wall structure 8a. As used herein, outer cyclone movement 20 and inner cyclone movement 22 refers to the two cyclones that are generated in response to the suction, wherein the inner cyclone movement 22 is located within the outer cyclone movement 20. The inner cyclone movement 22 combines a traditional cyclone and a non-tapered axial cyclone and includes an inner wall structure 8a in the form of a cylindrical cyclone tube 8. The inner wall structure 8a can be within the outer wall structure 1a.

The dust collector 90 can include inlet 3 and outlet 15 at the same end. The inlet 3 to the collection cyclone 1 can be situated completely underneath the inlet edge 7 of the first cyclone 8. The inlet 3 can be connected to a pressurized fluid source (not shown) which is configured to cause a pressure drop and in turn creates a suction force. The pressurized fluid source in at least one embodiment can be a blower or fan which causes a pressure drop across it. The inlet 3 can be fluidly coupled to an outlet 15. As used herein, fluidly coupled refers to the fluid coupling of components and can include one or more intermediary components which can be used in the coupling of the two components that are described as being fluidly coupled. Additionally, the dust collector inlet 3 can be located a predetermined distance below a top end 44 of the inner wall structure 8a. The top end 44 of the inner wall structure 8a can be configured to be in fluid communication with dust collector inlet 3 in the operating configuration. The inner wall structure 8a further includes a lower end 42 that is configured to be sealed in the operating configuration.

Figure 7:
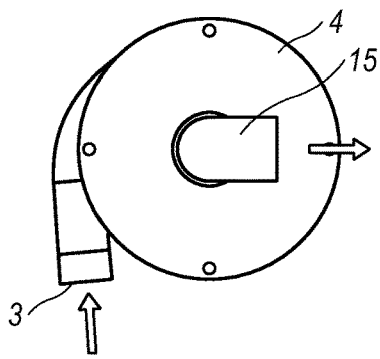
FIG. 7 is a top plan view of a dust collector of FIG. 6.
Figure 8:
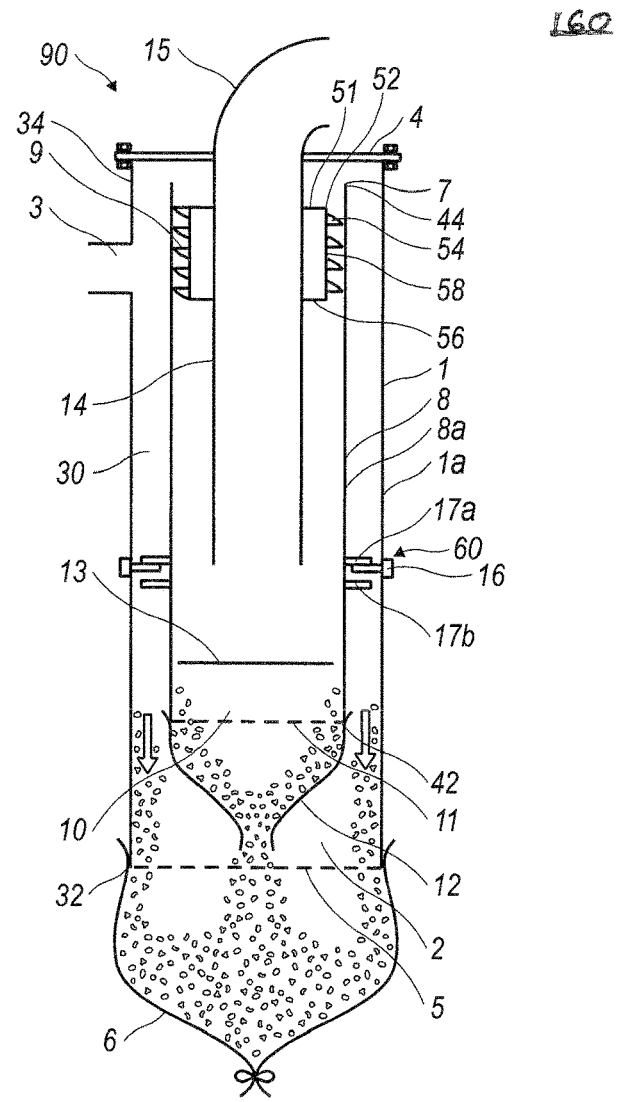
FIG. 8 is an exemplarily diagram of dust collector configured according to the present technology in a de-energized configuration.
Figure 9:
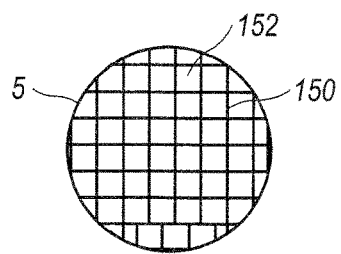
FIG. 9 is an example of a bottom member according to the present technology.

A top plan view of the dust collector is illustrated in FIG. 7. As illustrated, the dust collector includes a top cap 4. Also illustrated in FIG. 7 is the inlet 3 and outlet 15 as described herein.

Returning to FIG. 6, as the fluid passes from the inlet 3 to the outlet 15, the fluid passes through a static swirl generator 9, which can be situated around a central outlet pipe 14. The flow of the fluid can be controlled primarily by the inlet 3 and the outlet 15. In at least one embodiment, the swirl generator 9 can further assist in controlling and/or inducing an outer cyclone movement 20 between the outer wall structure 1a and the inner wall structure 8a, specifically in space 30 formed between the outer wall structure 1a and the inner wall structure 8a. Furthermore, the swirl generator 9 in combination with the suction force can be configured to induce an inner cyclone movement 22 inside the inner wall structure 8a, specifically in inside space 31 which is formed inside of the inner wall structure 8a. A top end 52 of the swirl generator 9 can be substantially flush with a top end 44 of the inner wall structure 8a.

The swirl generator 9 can cause the fluid and particles to rotate in helical orbits towards a swirl reflector below the inlet end 39 of outlet tube 14. While a cylindrical tube 14 is illustrated, the outlet tube 14 can have other shapes such as an oval, a triangle or other appropriate shape. The swirl generator 9 can include a plurality of helical channels composed of one or more guide vanes 54. The number of guide vanes 54 can be selected on desired characteristics of the flow. For example the number of vanes 54 can be between one and eight. In at least one embodiment, the number of vanes 54 is six. When the vanes 54 are two or fewer, the resulting flow can be harder to control and become turbulent. The number of vanes 54 implemented can vary with the size of the swirl generator 9, including the length and diameter of the swirl generator 9. The plurality of vanes 54 can be formed on an exterior 58 of a cylindrical member 51. Furthermore, the swirl generator 9 can have a bottom side 56 that is located closest to the inlet of the outlet tube 14.

As the swirl generator 9 increases in length, the amount of power required for the flow can increase. The swirl generator 9 can have a length, flow area, inlet and outlet angle of the vanes, being configured for a desired combination of separation sharpness and pressure drop. The swirl generator 9 as indicated above can be configured for a variety of flow configurations depending on the desired application.

The swirl generator 9 adds an additional flow regulator as compared to previous cyclone filtration devices which do not include a swirl generator 9. As explained below, the swirl generator 9 allows for control of the flow speed as well affecting other characteristics of the flow, such as maintaining laminar flow in circumstances in which a filtration device without the swirl generator 9 would not have laminar flow. In at least one embodiment, the swirl generator 9 can be configured to provide for flow speeds between twenty meters per second and eighty meters per second. The flow rate and the flow direction can be controlled by the number of guide vanes 54 and their height and angle to the center axis and thereby residence time of the particles before they reach the entrance to a particle chamber situated behind a central swirl reflector surrounded by openings.

If the cyclone is to be used at varying flow rates, for example a lower flow rate, the flow area of the swirl generator 9 can be reduced by means of an inflatable central wall (not shown) affixed to the outlet tube 14. When the inflatable central wall is affixed to the outlet tube 14, the inflatable central wall decreases the distance between the inner wall structure 8a and the outlet tube 14. As the distance between the inner wall structure 8a and the outlet tube 14 decreases, the flow area is reduced thereby causing the slow speed to increase allowing for increased efficiency and also high drag and pressure drop. The separation efficiency is proportional to the tangential velocity squared divided by the inner radius of the inner wall structure 8a, or rather the radius of the particles current radial position. However, the pressure drop also increases with this ratio and the final parameter selection will be a compromise between separation efficiency and pressure drop. At least one embodiment of technology provides a dust collector 90 in which flow through the collector is substantially free from turbulence. A swirl generator 9 according to the present disclosure can be designed to ensure a substantially laminar flow and to ensure that particles drawn into the collector 90 will have the appropriate flow angle, and an appropriate residence time in the cyclone, so to allow them to fall out against the wall boundary layer before they reach the position of the lower end 39 of the outlet tube 14, whereby the risk to be sucked into the outlet tube 14 is minimized. For example, when the dust collector 9 includes the swirl generator 9, the helical paths of the particles can be configured so that the particles reach the inner wall structure 8a before they encounter the swirl reflector 13. For example, in at least one embodiment, an angle of between 65 degrees and 80 degrees, relative to the central axis of revolution 92 is provided. In at least one embodiment, the angle can be between 70 and 75 degrees. If the angle is measured in a different direction, the angle can be said to be between 10 degrees and 25 degrees. And in at least one embodiment can be between 15 and 20 degrees.

During operation of the dust collector 90, when a fluid vortex reaches the swirl reflector 13, it turns rapidly towards the central outlet tube 14 through the center of the swirl generator 9 and moves further out through an outlet 15 in the cap 4. The relatively large distance between the particles separated out in the boundary layer along the inside of the cyclone tube and the location of the fast turnaround of the air vortex in the center of the cyclone, can contribute to effective collecting of the particles and/or dust. A gap 41 is formed between the swirl reflector 13 and the inner wall structure 8a. The gap 41 can be sized based upon the inner diameter of the inner wall structure 8a, when the inner wall structure is in the form of a circular tube. In at least one embodiment, the size of gap 41 is between five and ten percent of the inner diameter of the inner wall structure 8a. The gap 41 width can be dependent upon the diameter of the inner wall structure 8a. For example, in at least one embodiment when the diameter of the inner wall structure 8a is 0.5 meter, the gap 41 can be 0.025 meter. In another embodiment, when the diameter of the inner wall structure 8a is 0.1 meter, the gap 41 can be 0.008 meter.

In designing the dust collector 90, in at least one embodiment it can be desirable to configure the dust collector 90 to have laminar flow because laminar flow allows the small particles in the inner cyclone movement 22 to be easily captured when the small particles fall out of a generated cyclone when the particles collide with the inner wall structure 8a.

Additionally, when the swirl generator 9 is present the swirl generator 9 forces the flow to follow a predetermined path thereby causing the flow to be oriented along the path, even if the flow is reduced compared to a designed flow characteristic. For example with the presently described swirl generator 9, the inner cyclone movement 22 can be induced at flow speeds of less than half of the flow speed for which an inlet 3 and outlet 15 would normally be designed to operate. In at least one embodiment, the inlet 3 cross sectional area is half of the outlet 15 cross sectional area.

The above described components can generate an inner cyclone movement 22. As described above, the inner cyclone movement 22 can be optimized for efficiently capturing the fine dust particles and the smaller amount of dust, thereby increasing the working or operating periods because the dust chamber 10 does not need to be emptied as often. The outer cyclone movement 20 has a larger radius 33 compared with that of the radius 35 of the inner cyclone movement 22, and the outer cyclone movement 20 can easily accommodate the larger proportion of dust. In at least one embodiment, the dust and particles are configured to be emptied simultaneously from both the inner wall structure 8a and the outer wall structure 1a. The tangential inlet 72 of the outer cyclone tube 1 can be situated completely vertically below the inlet 74 of the inner cyclone movement 22. The system pressure drop can be significantly lower with the described arrangement, than would be the case with a single cyclone tube with the same tangential inlet 72. Furthermore, the present technology provides for increased suction relative to a dust collector with a single cyclone tube.

The present arrangement of an inner cyclone movement 22 within an outer cyclone movement 20 can require an inner lock 12 to be located between the inner cyclone tube 8 and the outer cyclone tube 1. A lock as presented herein refers to a member that is configured to lock the bottom end of a structure so as to allow for formation and/or separation of inner cyclone movement 22 from the outer cyclone movement 20. Additionally, a lock 6 can be located between the outer collector cyclone 1 and the surroundings. In at least one embodiment, the inner lock 12 or lock 6 can be a traditional mechanical lock in the form of a movable flap.

In another embodiment, the inner lock 12 or lock 6 can be a hose lock. When the inner lock 12 or lock 6 is a hose lock, the lock 12 or lock 6 can be configured to respond based on the presence of a cyclone within the inner wall structure 8*a* or between the outer wall structure 1*a* and the inner wall structure 8*a*, respectively. In at least one embodiment, the hose lock can be a member that is thin and flexible. For example, the material that the inner hose lock 12 is made of can be similar to that of an inner tube for tires. As a hose lock 6 under the outer cyclone 1, which has a weaker vacuum, can be a collecting bag made of plastic. The plastic bag can have a thickness of less than 0.5 mm. In yet another embodiment, the plastic bag can have a thickness of less than 0.2 mm. The hose lock 6 can collect coarser and finer dust.

In at least one embodiment, the first cyclone 8 can have in its lower end 42 a hose lock 12. The hose lock 12 can be arranged as described above. In at least one embodiment, the hose lock 12 does not have mechanical moving parts. In yet another embodiment, the hose lock 12 can be a shell. The shell can be a cylindrical shell, a conical shell or other shape that allows for passage particles there through. The shape of the shell can also be modified based on the shape of the inner wall member 8*a*. In at least one embodiment, the hose lock 12 can be elastic. Elastic as used herein refers to the ability of the material be deformable yet return to its original state. In at least one embodiment, the elastic material can be a rubber material that can be deformed and return to its original state. As the hose lock 12 is configured to substantially seal the bottom 42 of the inner wall structure 8*a*. The hose lock 12 can be formed out of a substantially thin material. For example, the material can be less than 2 mm thick, or even less than 1.5 mm thick or even less than 1 mm thick.

The hose lock 12 as described above can incorporate one or more of the features of the different embodiments presented herein.

The pressure difference between the inner cyclone movement 22 and outer cyclone movement 20 can cause a vertical upward force in the range greater than 100 kgf (1000 N) between them during operation of the dust collector 90. This vertical upward force can be used to allow for relative movement of the inner cyclone movement 22 to that of the outer cyclone movement 20. As presented herein, this movement is advantageous because it provides the inner cyclone tube 8 some freedom of movement in the axial direction relative to the outer cyclone tube 1, causing the accumulated dust in the inner cyclone 8 to be shaken down to the hose lock 6 or collection bag at start and stop, or by a relief valve is activated, which instantly disables/enables the vacuum in the system. Alternatively, the flow can be temporarily stopped when a moment with a valve or inlet is blocked manually, whereby the vacuum is released. When the vacuum is released, the inner hose lock 12 and hose lock 6 are released from a contracted configuration 100 to an expanded configuration 160 (compare the inner hose lock 12 and hose lock 6 of FIGS. 6 and 8, illustrating the contracted configuration 100 and expanded configuration 160, respectively). Additionally, when the vacuum is released, the inner wall 8*a* falls relative to the outer wall 1*a* a predetermined distance, such that it hits stop 17. When the inner wall 8*a* hits stop 17, the inner wall structure 8*a* shakes and the dust collected on the walls of the inner wall structure is allowed to be more easily released. In other embodiments, the stop 17 can take the form of other position restrictors. The position restrictors can be configured to limit the range of motion of the inner wall structure 8*a* relative to the outer wall structure 1*a*. Furthermore, the shaking causes the dust collected in the inner hose lock 12 to be more easily released as well.

The following presents additional details regarding the embodiment of the dust collector 90 as presented in FIGS. 6-9. Turning to FIG. 6, an embodiment of the present disclosure is presented. The dust collector 90 can include an outer wall structure 1*a*. The outer wall structure 1*a* can be in the form of a cylindrical tube as illustrated. In other embodiments, the outer wall structure 1*a* can take other shapes such as hexagonal or oval shape. In some embodiments, the outside wall shape can be a shape that is different than the inside shape of the outer wall structure 1*a*. For example, the outside wall shape of the outer wall structure 1*a* can be hexagonal but the inside wall shape of the outer wall structure 1*a* can be round. The lower part of the outer wall structure 1*a* can be arranged as a particle chamber 2 for accumulation of larger particles.

The outer wall structure 1*a* can have an inlet 3 for a particle loaded fluid flow. The outer wall structure 1*a* is fixed to an upper closure cap 4 and is fixed at the bottom with an outer bottom member 5. The cap 4 can be configured to seal the top portion 34 of the outer wall structure 1*a*. The outer bottom member 5 can be configured to allow the accumulated particles from the particle chamber 2 and 10 to pass there through into an hose lock 6 (which can be a dust bag in at least one example), which occurs when the flow is switched off. The outer bottom member 5 prevents the hose lock 6 from being sucked into the particle chamber when dust collector 90 is in an operating configuration 100 such that an outer cyclone movement 20 is created. While the illustrated embodiment includes a chamber formed between the outer bottom member 5 and the hose lock 6, in other embodiments the hose lock 6 will be substantially flush with a bottom side of the outer bottom member 5. In at least one embodiment, the outer bottom member 5 can be coupled to the bottom 32 of the outer wall structure 1*a*, such that the outer bottom member 5 is located internally to the hose lock 6. The outer bottom member 5 can take a variety of different forms, so long as the outer bottom member 5 prevents the hose lock 6 from entering the chamber and allows dust particles to pass there through. In at least one embodiment, the outer bottom member 5 can take the form of a grate or a grill such as the one shown in FIG. 9. When the outer bottom member 5 is a grate, it can include a plurality of support bars 150 which form a plurality of apertures 152 there between. The plurality of support bars 150 prevents the hose lock 6 from entering the particle chamber and the plurality of apertures 152 allow dust and particles to fall through. In other embodiments, the outer bottom member 5 can include other shapes of apertures. The size of the aperture can be selected based upon the size of the dust and particles that are designed to pass there through. In at least one embodiment, the hose lock 6 expands from a contracted configuration 100 to an expanded configuration 160, the contracted configuration 100 corresponds to the operating configuration.

After the fluid-flow has passed the inlet 3 the larger particles are separated from the main fluid flow by the outer cyclone movement 20. The particles can move in a spiral path towards the dust chamber 2. The smaller particles follow the main fluid flow upward and around an inlet edge 7 of an inner wall structure 8a. In at least one embodiment, the inner wall structure 8a can take the form of an internally placed cyclone tube. In at least one embodiment, the cyclone tube can be substantially cylindrical. In other embodiments, it can have a shape that is similar to the shapes that were described above with respect to the outer wall structure 1a.

The fluid flow is accelerated down a swirl generator 9, forcing the remaining particles to the inner wall structure's 8a inner surface. When the particles are near the inner surface of the inner wall structure 8a, the particles can become trapped in the boundary layer. Due to a strong centrifugal force, the particles can move downward in helical paths until they reach a single particle chamber 10, where they accumulate. The inner wall structure 8a can include an inner bottom member 11 which transmits collected particles from the particle chamber 10, down through an inner hose lock 12. The inner bottom member 11 can be configured similar to the outer bottom member as described above. For example, the inner bottom member 11 can be configured to allow particles to pass there through and prevent the hose lock 12 from entering the inner particle chamber. While the inner hose lock 12 is shown forming a gap space between the inner hose lock 12 and the inner bottom member 11, other embodiments can have the inner hose lock 12 configured such that is substantially flush with the bottom side of the inner bottom member 11. In at least one embodiment the gap space can be formed in response to the weight of the particles and dust in combination with the suction force of the inner cyclone movement 22.

When the flow through the dust collector is stopped, the hose lock 12 can be released as illustrated in FIG. 8. When the inner hose lock 12 is released from the contracted configuration of FIG. 6 to the expanded configuration of FIG. 8, the particles and dust can travel through the hose lock 12 into the hose lock 6. The expanded configure can occur when the flow is turned off and the hose lock 12 opens up. The inner hose lock 12 can be coupled to a lower end 42 of the inner wall structure 8a. In at least one implementation, the inner hose lock 12 is configured to seal the lower end 42 of the inner wall structure 8a.

In at least one embodiment, the inner hose lock can be a cylindrical or conical elastic shell. The cylindrical elastic shell can have a thickness of less than 2 millimeters. In yet another embodiment the cylindrical elastic shell can have a thickness of less than 1.5 mm. In still another embodiment the cylindrical elastic shell can have a thickness of less than 1 mm. In yet another embodiment, the hose lock 12 can be formed with a bottom, thereby preventing the passage of particles there through. In at least one embodiment, the hose lock 12 can be a plastic bag. The inner hose lock 12 can expand from a contracted configuration 100 to an expanded configuration 160, the contracted configuration 100 corresponds to the operating configuration. The inner bottom member 11 can be coupled to the bottom 42 of the inner wall structure 8a, such that the inner bottom member 11 is located internally to the inner hose lock 12.

When the purified fluid flow leaves the swirl generator 9, it also moves in helical paths down until it picks up again at the swirl reflector 13 and leaves the dust collector 90 through a central outlet tube 14 and out through an outlet 15. (The flow path is also indicated by the arrows in FIG. 6).

The central outlet tube 14 and the outlet 15 can be coupled to the swirl generator 9 and the top cap 4, while the inner wall structure 8a can be vertically displaceable on the outside of the swirl generator 9. The possible vertical displacement is limited by the mounting pins 16 inserted through the cylindrical tube 1a and on the inner cyclone tube 8a outside mounted stop lugs 17. When the flow is switched on, the inner cyclone tube 8a is moving upward but is stopped by the upper stop lugs 17a, and when the flow is switched off, the inner cyclone tube 8a is dropping downwards and is stopped by the lower stop lugs 17b, wherein the particles trapped in different places in the dust collector 90, loosens and fall downwards towards the hose lock 6. Alternatively, the stop lugs 17 can be mounted on top of the swirl generator 9 and allow the edge 7 of the inner cyclone tube 8a only to move upwardly a predetermined distance. In that instance the upper stop lug 17a is not needed. In at least one embodiment, the motion of the inner cyclone tube 8a relative to the cylindrical tube 1a occurs during a start and stop of the dust collector 90. In another embodiment, the motion of the inner cyclone tube 8a relative to the cylindrical tube 1a occurs when a relief valve closes or opens, which instantly activates or deactivates the vacuum in the system (dust collector 90). The inner cyclone tube 8 can also be mounted in a fixed position within the outer cyclone tube 1.

Figure 10:
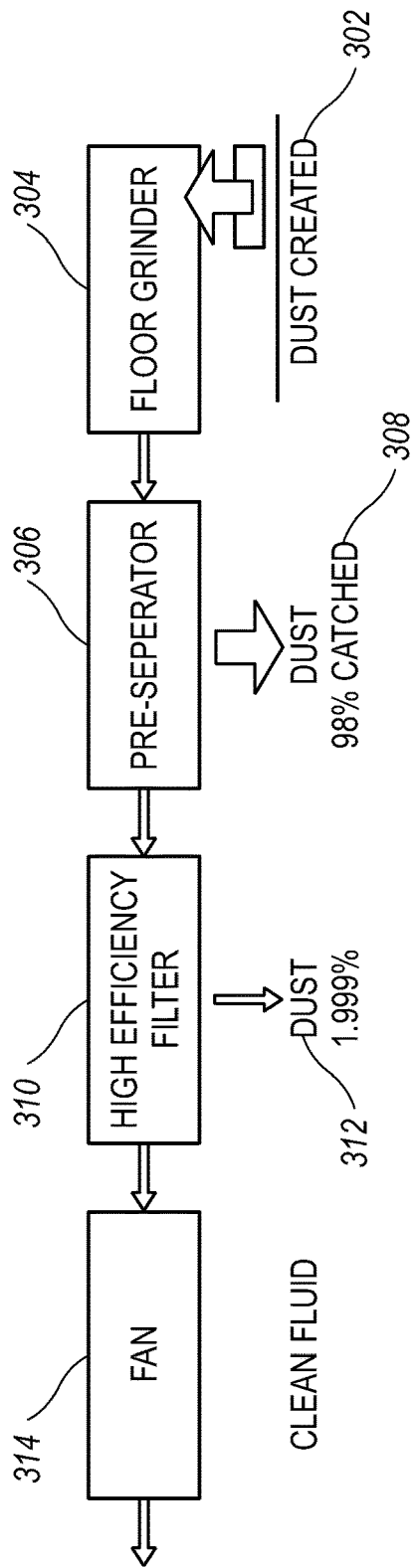
FIG. 10 illustrates an exemplarily diagram of a system that includes a filter unit and a dust collector, according to the present technology.
Figure 11:
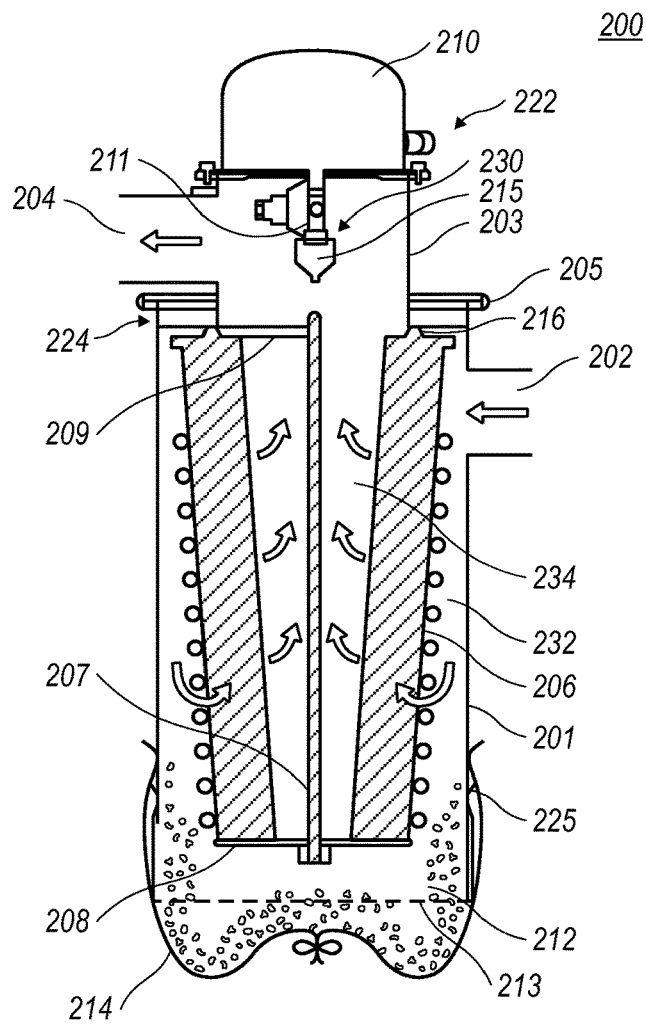
FIG. 11 is an exemplarily diagram of a filter unit configured according to the present technology in an operating configuration.
Figure 12:
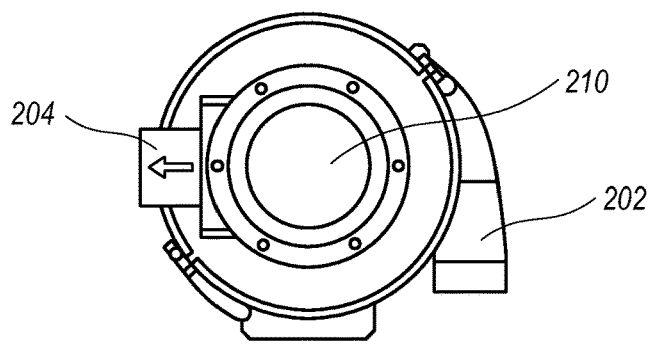
FIG. 12 is a top plan view of the filter unit of FIG. 11.
Figure 13:
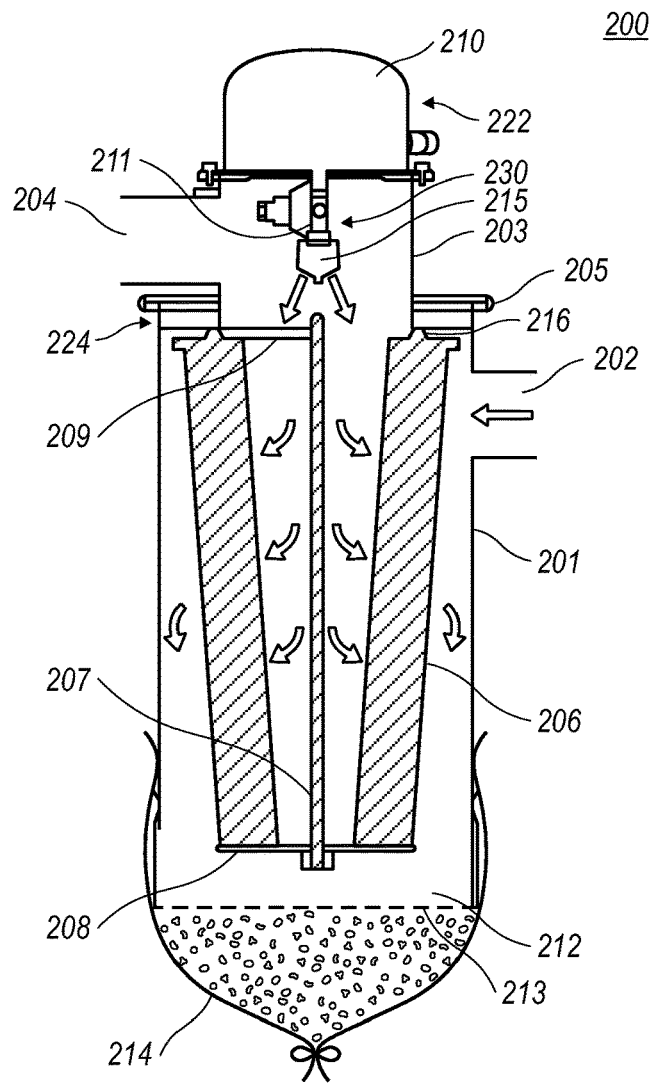
FIG. 13 is an exemplarily diagram of a filter unit configured according to the present technology in a back flush configuration.
Figure 14:
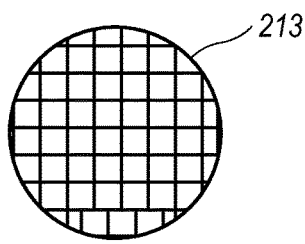
FIG. 14 is an example of a bottom member, for the filter of FIG. 11, according to the present technology.

In at least one embodiment, as illustrated in FIGS. 10, 11, and 12, the dust collector 9 can further include an additional filter 200. The filter 200 can be fluidly coupled to the outlet 15 of the dust collector 90. The filter 200 can be configured to remove particles and/or contaminants that are not captured by the dust collector 90. For example, the filter 200 can be configured to collect hazardous dust. For example, hazardous dust can include asbestos dust and silica dust. While the filter 200 as presented herein can be coupled to the dust collector 90 as presented herein, the filter 200 can be implemented with other types of dust collectors including standard dust collectors.

The handling of the contaminated filter media can expose the cleaned area and persons involved to dangerous dust, for example asbestos and silica. In concrete floor grinding, it is common that the dust collector filter is clogged and most of the dust is left on the floor and the operator, who is paid per square meter, starts cleaning the filters by hand, either by shaking the filter media against the floor or with some tool. Some dust collectors include a cleaning option via a depression valve, which usually consists of a lever that the operator can use repeatedly to release the vacuum and hopefully make the dust cakes fall of the filter media.

Embodiments within the disclosure address the issues described in the preceding paragraph. In at least one embodiment, the filter of a dust collector can be divided into one permanent fixed clean part and one dismountable contaminated part, which can be changed without risk for any exposure to the environment or the user. In at least one embodiment, the contaminated part can then be cleaned and reloaded with a new filter in a special room or device intended for this purpose. In yet another embodiment, the dismountable contaminated part can be designed of a disposable material, so the whole contaminated part can be disposed of after use.

In at least one embodiment, the presently disclosed filter can be configured to catch the small and/or dangerous particles. However, the filter as presented herein is not designed to handle an incoming fluid that includes large amounts of dust. Thus, the present filter is intended to be used in conjunction with at least one or more dust separation devices/pre-separator unit. In at least one embodiment, the dust separation devices/pre-separator unit can include one or more cyclones generators, which can be configured to remove at least 80% of the dust from the fluid stream. In at least one embodiment, the dust separation devices/pre-separator unit can be the dust collector as described herein.

Depending on the efficiency of the dust collector and amount and type of dust present, the filter media has to be cleaned in certain intervals, in order to reduce the increased pressure resistance over it, which reduces the suction of the system. An example of a system is illustrated in FIG. 10. As illustrated in FIG. 10, a collector system, can include a floor grinder 304, a pre-separator 306, a high efficiency filter 310 and a fan 314 arranged in that order. The diagram illustrates that the floor grinder 304 creates the dust 302. The pre-separator 306 receives the mixture of fluid (for example, air) and dust. As illustrated the pre-separator 306 is illustrated as removing about 98% of the dust 308 from the mixture of fluid and dust. The partially cleaned fluid is passed into the high efficiency filter 310, which will be described further below. The high efficiency filter 310 can be further configured to remove 1.999% (312) of the remaining 2% percent of dust from the fluid. The substantially clean fluid is passed onto a fan 314 which expels substantially cleaned fluid that has less than 0.001% of the dust that the mixture of fluid and dust had. The percentages removed by the pre-separator 306 and high efficiency filter 310 can vary from the ones indicated above. In particular, the pre-separator 306 can be configured to remove between 92% and 99% of the dust. The high-efficiency filter 310 as presented herein can be configured to remove 1% to 8% of the dust. As indicated above, the pre-separator 306 can be the dust collector as described above or another type of pre-separator 306. Additionally, while reference has been made to a floor grinder 304 for producing the dust 302, the dust can be produced by any process that produces dust for example, wood cutting, metal grinding, sawing, and the like.

Typically such a dust collecting system shows 3 kPa constant pressure drop over the grinding machine and hose, 5 kPa over an effective cyclone pre separator and 1 kPa over a clean high efficiency filter and up to 3 kPa over a clogged one, that needs to be cleaned.

In the present technology, cleaning of the high efficiency filter can be done by back-flushing with compressed air. In the case of a movable dust collector for floor grinding, a small mini-compressor is fitted to the unit, feeding compressed air to a pressure vessel integrated into the filter, in order to deliver an instant powerful shock wave into the filter media arrangement, for example a cartridge filter, which cleans the filter and deliver the dust cakes down to a dust container or dust bag. In other embodiments, the pressure vessel integrated into the filter can be configured to store a number of charges used to clean a cartridge filter/filter media.

Different strategies can be used to choose the number of flushes and the interval between them, for example the pressure drop after the filter or over the filter can activate the back-flush procedure. A small programmable logic controller (PLC) can be used for controlling the back flushes, can then check if the flushes were effective, and if not, flush some more and/or make the cleaning more effective by releasing the pressure difference over the filter media, via a relief or block valve for a short while, when the system back flushes. For normal light floor grinding it can be sufficient to back flush twice a minute and then when the operator stops the fan and the vacuum just is disappearing, but before the dust bag is removed.

In a dust collector system suitable for floor grinding the PLC also can control the electric phase order and, if wrong, correct the order, so that the fan will draw in air and dust, without causing the dust to be blown out. Additionally, the PLC can monitor, either directly or indirectly via the current, the temperature in the fan and motor. The PLC can stop the fan when a specific temperature is reached to prevent overheating, which can result in a failure.

FIG. 11 illustrates an exemplarily filter unit 200 according to the present technology. The filter unit 201 can include a filter body 201. The filter body 201 can have an inlet 202 for contaminated fluid. In at least one embodiment, the inlet 202 can be tangential, as illustrated in FIG. 12, which is a top plan view of the filter unit 201.

The filter body 201 represents a part of the filter unit 200 which is contaminated with dust particles. Thus, the filter unit 200 can be described as having a contaminated portion 232. The filter body 201 can be coupled an outlet chamber 203. The outlet chamber 203 can be on a clean portion 234 of the filter unit 200. The outlet chamber 203 can be coupled to an outlet 204 for cleaned fluid. The contaminated portion 232 of the filter unit 200 can be separated from the clean portion 234 by releasing a fastener 205. In at least one embodiment, the fastener 205 can be a V-clamp coupling unit. In other embodiments, the fastener 205 can be another fastener configured to releasably couple the contaminated portion 232 to the clean portion 234.

A filter media 206 can be located inside the filter body 201. The filter media 206 can be conical or straight. Additionally, filter media 206 can be coupled to the filter body 201 by central bar 207. The central bar 207 can be coupled to one or more points of attachment inside the filter body 201, such as a spoke 209. The filter media 206 can form a barrier between the contaminated portion 232 and the clean portion 234 of the filter unit 200. In addition to the filter media 206, the clean portion 234 is separated from the contaminated portion by a bottom sealing plate 208 and a sealing device 216 in an upper plate including one or more spokes 209 in the center. The upper plate allows the clean fluid to pass into the outlet chamber 203. Then, the clean fluid continues further to the outlet 204.

The outlet chamber 203 can be coupled to a pressure vessel 210. The pressure vessel 210 can be configured to contain a compressed gas, for example air. The pressure vessel 210 can further be configured to be in fluid communication with the clean portion 234 of the filter unit 200 via a valve 211 and a nozzle part 215. Alternatively, the integrated pressure vessel 210 can be described as being coupled to a clean filter side 222. The nozzle part 215 can contain one or more nozzles. The nozzle part 215 can be configured to clean the filter media 206 through back flushing it from the inside with high velocity gas bursts, see FIG. 8 illustrating the back flushing of the filter media 206 of the filter unit 200.

As mentioned above the dust enters the filter unit 200 through the inlet 202 and is then trapped by the filter media 206. The outlet 204 can be coupled to a suction device, such as a fan or some other device driving the flow through the filter unit 200, for example see the diagram of FIG. 10.

After some time of operation, the filter media 206 can become covered with a dust layer and the pressure drop over the filter unit 200 will increase, such that is necessary to clean the filter media 206. The filter media 206 can be cleaned by one or more back flush gas bursts from the nozzle part 215. The back flush gas bursts from the nozzle part 215 can be performed during operation of the filter unit 200. In at least one embodiment, the back flush gas bursts from the nozzle part 215 can be performed after the flow is shut off. When the back flush gas bursts from the nozzle part 215 are performed after the flow is shut off, the back flushing can be more effective. In at least one embodiment, the back flushing arrangement 230 can be configured to flush the filter unit 200 by reversing the flow of fluid through the filter unit 200.

Additionally, a PLC, can be coupled to the valve 211 of the back flushing arrangement 230. The PLC can control the back flushing of the filter 200. Additionally, one or more pressure sensors can be configured to detect a drop in pressure and the programmable logic control configured to begin a back flushing operation when the pressure drop changes beyond a predetermined level.

Furthermore, during back flushing the dust can fall down into a dust chamber 212 and further down through a dismountable bottom member 213. In at least one embodiment, the bottom member 213 is a grate device. The dust falls through the bottom member 213 into a dust bag 214, or a tight dust canister. The bottom member 213 can be configured to allow the dust bag 214 to be sucked up against the bottom member 213, as illustrated in FIG. 11. The dust bag 214 can be sucked up against the bottom member 213 even with dust still in the bag 214.

The filter unit 200 can include an outlet 204 fluidly coupled to the inlet 202. Additionally, the filter unit 200 can include a filter media 206 configured to divide a flow path into a clean portion 234 and a contaminated portion 232, such that the fluid flows from the inlet 202 and through the filter media 206 before exiting the filter 200 through the outlet 204. The filter unit 200 can be configured to remove very fine particles from the fluid, wherein the fine particles are smaller than 0.2 millimeters in the largest dimension. The inlet 202 can be configured to be fluidly coupled to an outlet 15 of a dust collector 90. A fastener 205 can be configured to couple a clean filter side 222 to a contaminated filter side 224. The contaminated filter side 224 can be a disposable portion that can be disposed of in accordance with hazardous material handling procedures.

Additionally, the contaminated filter side 224 can further include a filter hose lock 214. The filter hose lock 214 can be configured to be coupled to a bottom end 225 of the contaminated filter side 224.

The filter unit 200 can further include a filter bottom member 213 configured to prevent the hose lock 214 from being drawn into the contaminated filter side 224 and allowing particles to pass through the filter bottom member 213 in a state in which the vacuum is removed. In at least one embodiment, the filter hose lock 214 can be a bag having a sealed end.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the scope of the disclosure.

What is claimed is:

1. A dust collector comprising:
an outer wall structure comprising a first cylindrical tube;
an inner wall structure comprising a second cylindrical tube that is within the outer wall structure;
an outlet tube disposed within the inner wall structure, wherein a portion of the outlet tube extends into the inner wall structure;
an inner hose lock coupled to a lower end of the inner wall structure; and
an inner bottom member coupled to the lower end of the inner wall structure;
wherein the inner hose lock is configured to be in a contracted configuration to prevent particles from traveling through the inner hose lock in response to a vacuum flow within the dust collector, and wherein the inner hose lock is configured to be in an expanded configuration, in response to the vacuum flow in the dust collector being released, where the inner hose lock is open to permit particles to travel through the inner hose lock; and
wherein the inner bottom member is configured to allow particles to pass through the inner bottom member and prevent the inner hose lock from entering the inner wall structure.

2. The dust collector of claim 1, further comprising a dust collector inlet, wherein the dust collector inlet is in fluid communication with an inlet hose and a space formed between the outer wall structure and the inner wall structure.

3. The dust collector of claim 2, wherein the dust collector inlet is disposed below an inlet edge of the inner wall structure.

4. The dust collector of claim 2, wherein the dust collector inlet is located a predetermined distance below a top end of the inner wall structure.

5. The dust collector of claim 4, wherein the top end of the inner wall structure is configured to be in fluid communication with the dust collector inlet in an operating configuration.

6. The dust collector of claim 5, wherein the inner wall structure further includes a lower end that is configured to be sealed in the operating configuration.

7. The dust collector of claim 1, further comprising an outer hose lock coupled to a lower end of the outer wall structure.

8. The dust collector of claim 7, wherein the outer hose lock comprises a cylindrical elastic shell.

9. The dust collector of claim 8, wherein the cylindrical elastic shell of the outer hose lock has a thickness of less than 2 millimeters.

10. The dust collector of claim 7, wherein the outer hose lock expands from a contracted configuration to an expanded configuration, the contracted configuration corresponding to the operating configuration.

11. The dust collector of claim 7, further comprising an outer bottom member coupled to the bottom of the outer wall structure, such that the outer bottom member is located internally to the outer hose lock, wherein the outer bottom member is a grate.

12. The dust collector of claim 11, wherein the outer bottom member provides a structure against which the outer hose lock can press in the contracted configuration corresponding to the operating configuration and the outer bottom member being further configured to allow particles to pass through the lower end of the outer wall structure in a non-operating configuration in which there is no cyclone inside the outer wall structure.

13. The dust collector of claim 1 wherein the inner hose lock comprises a cylindrical elastic shell having a thickness of less than 2 millimeters.

14. The dust collector of claim 1, further comprising the inner bottom member coupled to the lower end of the inner wall structure, such that the inner bottom member is located internally to the inner hose lock.

15. The dust collector of claim 1, wherein the outlet tube is substantially centered relative to an inlet edge of the inner wall structure and swirl generator is disposed around the outlet tube.

16. The dust collector of claim 1, further comprising a swirl generator disposed to fluidly couple an outer cyclone movement between the outer wall structure and the inner wall structure to an inner cyclone movement inside the inner wall structure, wherein the swirl generator is substantially flush with an inlet edge of the inner wall structure, wherein the inlet edge defines a top end of the inner wall structure.

17. The dust collector of claim 1, wherein the inner hose lock does not comprise mechanical moving parts.

18. The dust collector of claim 16, wherein the inner hose lock is further configured to be in the contracted configuration in response to the inner cyclone movement.

19. The dust collector of claim 1, wherein, in the expanded configuration, the inner hose lock is open to permit dust to travel through the inner hose lock and into an outer hose lock coupled to a lower end of the outer wall structure.

20. A dust collector comprising:

an outer wall structure comprising a first cylindrical tube;

an inner wall structure comprising a second cylindrical tube that is within the outer wall structure;

an outlet tube disposed within the inner wall structure, wherein a portion of the outlet tube extends into the inner wall structure;

an outer hose lock coupled to a lower end of the outer wall structure; and an outer bottom member coupled to the bottom of the outer wall structure, wherein the outer bottom member is located internally to the outer hose lock;

wherein the outer hose lock expands from a contracted configuration to an expanded configuration, the contracted configuration corresponding to an operating configuration;

wherein the outer bottom member provides a structure against which the outer hose lock presses when in the contracted configuration.

\* \* \* \* \*